United States Patent
Sasaki (10) Patent No.: US 7,127,176 B2
(45) Date of Patent: Oct. 24, 2006

(54) OPTICAL TRANSMISSION SYSTEM OF RADIO SIGNAL OVER OPTICAL FIBER LINK

(75) Inventor: Kensuke Sasaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 662 days.

(21) Appl. No.: 10/324,002

(22) Filed: Dec. 20, 2002

(65) Prior Publication Data

US 2004/0001719 A1 Jan. 1, 2004

(30) Foreign Application Priority Data

Jun. 26, 2002 (JP) ............... 2002-186518

(51) Int. Cl.
*H04B 10/00* (2006.01)
(52) U.S. Cl. .................. 398/115; 398/116; 398/117
(58) Field of Classification Search ........ 398/115–117, 398/183–194
See application file for complete search history.

(56) References Cited

U.S. PATENT DOCUMENTS

| | | | |
|---|---|---|---|
| 5,953,045 A * | 9/1999 | Tanishima ............... | 725/119 |
| 6,525,849 B1 * | 2/2003 | Tsao et al. .................. | 398/9 |
| 6,614,819 B1 * | 9/2003 | Fish et al. .................. | 372/26 |
| 2002/0048071 A1 * | 4/2002 | Suzuki et al. ............... | 359/173 |
| 2002/0089719 A1 * | 7/2002 | Joo et al. ..................... | 359/127 |
| 2003/0016418 A1 * | 1/2003 | Westbrook et al. ......... | 359/145 |

OTHER PUBLICATIONS

Katsutoshi Tsukamoto et al., "Current Activities and Future Trends in Radio-over-Fiber Network", Technical Survey, vol. 80, No. 8, 1997, pp. 859-868.
Yoshiaki Tarusawa et al., "Single Fiber Multi Terminal Optic Links for Mobile Radio Communications using Automatic Wavelength-Offset Control", Technical Report of IEICE, RCS94-70 (Sep. 1994), pp. 7-12.

* cited by examiner

*Primary Examiner*—Dzung D. Tran
(74) *Attorney, Agent, or Firm*—Wenderoth, Lind & Ponack, L.L.P.

(57) ABSTRACT

In coupling a control station transmitting a radio signal to a plurality of base stations each transmitting the radio signal to a terminal station by an optical fiber, and dependently connecting the plurality of base stations to the optical fiber, the control station includes a radio signal transmitter and an electrical-to-optical converter. Each of the base stations including an SOA-EAM comprises a semiconductor optical amplifier (SOA) and an electro-absorption modulator (EAM), a down link radio signal amplifier, and a down link antenna, the SOA-EAM receiving an optical signal from the control station. The optical transmission system can prevent optical power from lowering even if the number of base stations increases and can facilitate adding a base station since an optical coupler is not used.

14 Claims, 5 Drawing Sheets

OPTICAL TRANSMISSION SYSTEM OF RADIO SIGNAL OVER OPTICAL FIBER LINK

BACKGROUND OF THE INVENTION

1. Field of the Invention

The present invention relates to an optical transmission system with a radio technique merged with an optical communication technique, using an optical fiber line between a control station which transmits a radio signal to a plurality of base stations and the base stations which transmit the radio signal to terminal stations. This application is a counterpart application of Japanese application Serial Number 186518/2002, filed Jun. 26, 2002, the subject matter of which is incorporated herein by reference.

2. Description of the Related Art

As the optical transmission system with the radio technique merged with the optical transmission technique, the following are well known:

Tsukamoto et al., "Current Activities and Future Trends in Radio-over-Fiber Network", Journal of IEICE (Institute of Electronics, Information and Communication Engineers), Vol. 80, No. 8, pp. 859–868, August 1997; and Tarusawa et al., "Single Fiber Multi Terminal Optic Links for Mobile Radio Communication using Automatic Wavelength-Offset Control", Shingakugiho, RCS94-70, pp. 7–12, September 1994.

Nowadays, following the rapid spread of mobile communications, the introduction of a micro-cell system has progressed with a view of securing frequency band and making portable equipment small in size. According to the micro-cell system, a micro-cell zone having a small zone radius is provided so as to improve the utilization efficiency of radio frequency. To provide wideband service, many radio base stations are required. On the other hand, the radio frequency is moving to millimeter wave band so as to secure wideband frequency. However, it is difficult to realize long-distance signal transmission because of the high attenuation of signals in space. In these circumstances, a communication technique with radio waves merged with light, or photonics which exhibits advantages of both optical communication and radio communication has been considered.

As for the mobile communication system into which the micro-cell method has been gradually introduced, a method for transmitting signals using the optical fiber communication technique which is characterized by wide area coverage and wideband has been considered. An optical fiber connects a base station to a control station. A radio signal received by the base station is transmitted to the control station while the radio form of the signal is maintained. Control functions are collectively provided at the control station, whereas it suffices that the base station has only a function of converting a radio signal to an optical signal and a function of converting an optical signal to a radio signal. Therefore, a small-sized system can be provided at low cost.

Further, in order to improve optical fiber utilization efficiency while making use of the low transmission loss of the optical fiber, an optical fiber link method using one optical fiber for each of an up link and a down link and dependently connecting many base stations has been considered.

The configuration of the optical transmission system which employs a method for dependently connecting many base stations to an optical fiber connected to a control station will be described. In the optical transmission system for a down link, the control station consists of a radio signal transmitter and an electrical-to-optical converter (E/O converter). The E/O converter converts a radio signal with a frequency $f_d$ to an optical signal, and transmits the converted optical signal to the optical fiber. A plurality of (n) radio base stations are dependently connected to the optical fiber. Each radio base station consists of a photodiode (PD), a radio signal amplifier (RF-AMP), and an antenna.

The optical signal transmitted by the optical fiber is distributed by an optical coupler and input into the PD. The PD, which acts as an optical-to-electrical converter (O/E converter), converts the optical signal to a radio signal. The radio signal is amplified by the RF-AMP to have desired power and the resultant radio signal is output from the antenna to the air. The mobile terminal receives the radio signal thus output.

The optical coupler used herein is to distribute optical power to a plurality of base stations. If the coupling factor of the optical coupler is, for example, 0.1, the optical power distributed to branched base stations is 10% and the remaining 90% is output to the transmission optical fiber as it is. To make the optical power distributed to the respective base stations equal, the optical power distributed to each base station is set at (output from the control station×1/the number of base stations). As the number of base stations increases, the coupling factor lowers.

In addition, regardless of the number of base stations, the optical power distributed to the first base station is set at (output from the control statio×1/the number of base stations). The coupling factor of the optical coupler which distributes the optical power to the terminal base station and the base station just before the terminal base station is 0.5. Thus, the number of the necessary coupling factors of the optical couplers is (the number of base stations—1) between (1/the number of base stations) and 0.5. If the number of base stations increases, it is necessary to provide optical couplers having coupling factors fragmented according to the increased number of base stations.

It is assumed herein that, for example, ten base stations are dependent on the down link of the optical transmission system. If so, to deliver equal optical power to the respective base stations, the optical power delivered to each base station is set at one-tenth of the optical power output from the control station. Further, the PD-side coupling factor of each optical coupler is required to have coupling factor accuracy as shown in Table 1 below. To simplify calculation, it is assumed herein that there is no transmission fiber loss and no optical coupler coupling loss.

TABLE 1

| No. | 1 | 2 | 3 | 4 | 5 | 6 | 7 | 8 | 9 |
|---|---|---|---|---|---|---|---|---|---|
| Coupling factor | 0.100 | 0.111 | 0.125 | 0.143 | 0.167 | 0.201 | 0.251 | 0.335 | 0.500 |

A plurality of base stations are thus dependently connected to one optical fiber using optical couplers. In this case, if the number of base stations increases, the optical power which can be delivered to each base station disadvantageously lowers and the coupling factor of each optical coupler is disadvantageously required to have higher accuracy. Further, if a base station connected to this down link optical fiber is added, all the base stations should change their optical couplers to those having newly designed coupling factors. Therefore, it is disadvantageously impossible to easily increase the number of base stations.

SUMMARY OF THE INVENTION

The present invention has been made in view of the above-stated disadvantages of the conventional optical transmission system with the radio transmission technique merged with the optical transmission technique. It is an object of the present invention to provide a novel, improved optical transmission system of radio signal over optical fiber link, which can prevent optical power from lowering even if the number of base stations increases and which can facilitate adding a base station if a plurality of base stations are dependently connected to one optical fiber.

To attain this object, according to the first aspect of the present invention, there is provided an optical transmission system of radio signal over optical fiber link for a down link, comprising: a control station; and a plurality of base stations dependently connected to one another by an optical fiber, wherein the control station comprises: a radio signal transmitter transmitting an electric signal; and an electrical-to-optical converter converting the electric signal to an optical signal, and outputting the optical signal to the optical fiber, and each of the base stations comprises: an amplifier-converter amplifying the received optical signal to transmit the amplified optical signal to the other base stations, converting the optical signal to the electric signal; a radio signal amplifier amplifying the electric signal; and a down link antenna transmitting the amplified electric signal.

By constituting the optical transmission system out of the control station and the base stations, and receiving an optical signal transmitted from the control station to the optical fiber using the amplifier-converter which comprises the semiconductor optical amplifier and the electro-absorption modulator at the base station, it is possible to directly connect the base stations to the optical fiber without using optical couplers and perform optical-to-electrical conversion. Due to this, even if the number of base stations increases, the optical power is maintained to facilitate the dependent-connection of the base stations. In addition, the amplification function of the amplifier-converter enables transmitting equal optical power from all the base stations. Thus, it is possible to obtain an optical transmission system for a down link wherein even if a base station is added halfway along the optical fiber, the other base stations are not influenced by the addition.

The semiconductor optical amplifier which constitutes the amplifier-converter amplifies an optical signal. The electro-absorption modulator, which constitutes the amplifier-converter amplifies, does not serve the original function of a modulator but permeates a part of the amplified optical signal to transmit the part of the optical signal to the other base stations, detects the remaining optical signal to convert the remaining optical signal to an electric signal. This amplifier-converter may be constituted out of the components of a semiconductor optical amplifier and an electro-absorption modulator separately of each other. It is, however, preferable to use the semiconductor optical amplifier and the electro-absorption modulator formed integrally with each other on a semiconductor substrate. This is because it is possible to make the base station smaller in size and to facilitate manufacturing the system.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

DESCRIPTION OF THE PREFERRED EMBODIMENTS

The preferred embodiments of an optical transmission system of radio signal over optical fiber link according to the present invention will be described hereinafter in detail with reference to the accompanying drawings. It is noted that constituent elements having substantially same functions and constitutions are denoted by the same reference symbols, respectively, and will not be repeatedly described in this specification and the drawings.

First Embodiment

Figure 1:
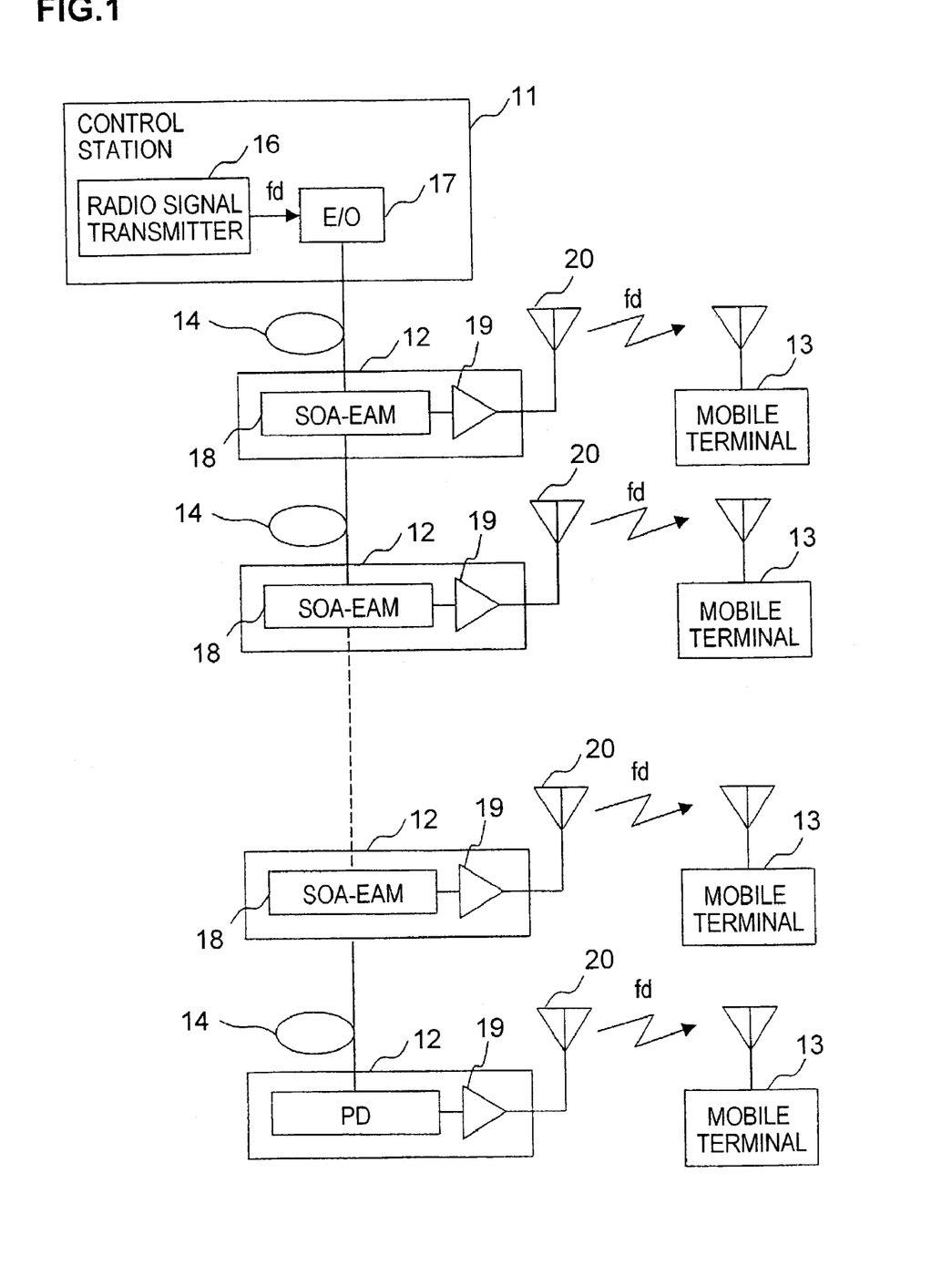
FIG. 1 is a schematic block diagram of an optical transmission system of radio signal over optical fiber link in the first embodiment according to the present invention.

FIG. 1 is a block diagram of an optical transmission system of a radio signal over an optical fiber link in the first embodiment according to the present invention. As shown in FIG. 1, in the optical transmission system for a down link, a control station 11 comprises a radio signal transmitter 16 and an electrical-to-optical converter (E/O converter) 17. At the control station, a radio signal with a frequency $f_d$ is converted to an optical signal by the E/O converter 17, and output to an optical fiber 14. A plurality of (n) radio base stations 12 are dependently connected to the control station 11 using the optical fiber 14.

Each radio base station 12 comprises an SOA-EAM 18, which is an amplifier-converter comprising a semiconductor optical amplifier (SOA), and an electro-absorption modulator (EAM), a radio signal amplifier (RF-AMP) 19 and an antenna 20.

The SOA-EAM 18 is constituted to provide the EAM in rear of the SOA and is used as an optical-to-electrical converter (O/E converter). According to the conventional art, an optical signal transmitted by the optical fiber is distributed to the base stations 12 by optical couplers, respectively, and O/E converted by the photodiode (PD). If the SOA-EAM 18 is used as the O/E converter as shown in the first embodiment, it is unnecessary to employ the conventional optical couplers. The SOA-EAM 18, which is directly connected to the optical fiber, converts an optical signal to a radio signal. A lens is arranged between the SOA-EAM 18 and the optical fiber 14 to thereby realize optical coupling.

The SOA-EAM 18 may be constituted to provide the SOA and the EAM individually or may be constituted to have the SOA and the EAM formed integrally with each other on a semiconductor substrate. In this embodiment, the SOA-EAM 18 having the SOA and the EAM formed integrally with each other is employed. The SOA functions to amplify input optical power if current is injected thereto. The amplification factor of the SOA increases up to a factor for saturation output power, according to the quantity of injected current. The EAM functions to absorb optical power if reverse bias voltage is applied thereto. If the voltage applied thereto is made higher, the absorption quantity of the EAM increases and the permeation quantity thereof decreases. The SOA amplifies the optical power absorbed by the EAM and the transmission loss of the optical signal which is generated between the base station and the next station.

In this embodiment, the EAM is not employed as an optical modulator but an optical detector. Since the EAM does not completely absorb the optical signal but permeates a part of the optical signal, the optical signal can be transmitted to the next base station. In addition, since the SOA amplifies the optical power absorbed by the EAM and thereby compensates for the transmission loss, the optical signal can be transmitted without decreasing the optical power thereof. Further, since the SOA amplifies the optical power at each base station, equal optical power is output from the respective base stations. Even if a base station is added halfway along the optical fiber, the other base stations are not influenced by the addition.

The operation of the optical transmission system in this embodiment will next be described. The radio signal with a frequency $f_d$ transmitted from the radio signal transmitter 16 of the control station 11 is converted to an optical signal by the electrical-to-optical converter (E/O converter) 17 and transmitted to the optical fiber 14. At the radio base station 12, a part of the optical signal transmitted by the optical fiber 14 is absorbed by the SOA-EAM 18, converted to a radio signal, amplified to have desired power by the RF-AMP 19, and transmitted from the antenna 20 to the air. The radio signal is received by, for example, a mobile terminal 13.

Further, the SOA-EAM 18 transmits the remainder of the optical signal transmitted by the optical fiber 14 to the next radio base station 12 through the optical fiber 14. Thus, at each radio base station 12, the conversion of the optical signal to the radio signal and the transmission of the optical signal to the next radio base station 12 are simultaneously conducted. In this embodiment, a photodiode (PD) is employed as an O/E converter provided at the terminal ($n^{th}$) radio base station 12. Alternatively, the SOA-EAM 18 may be employed as the O/E converter.

Figure 4A:
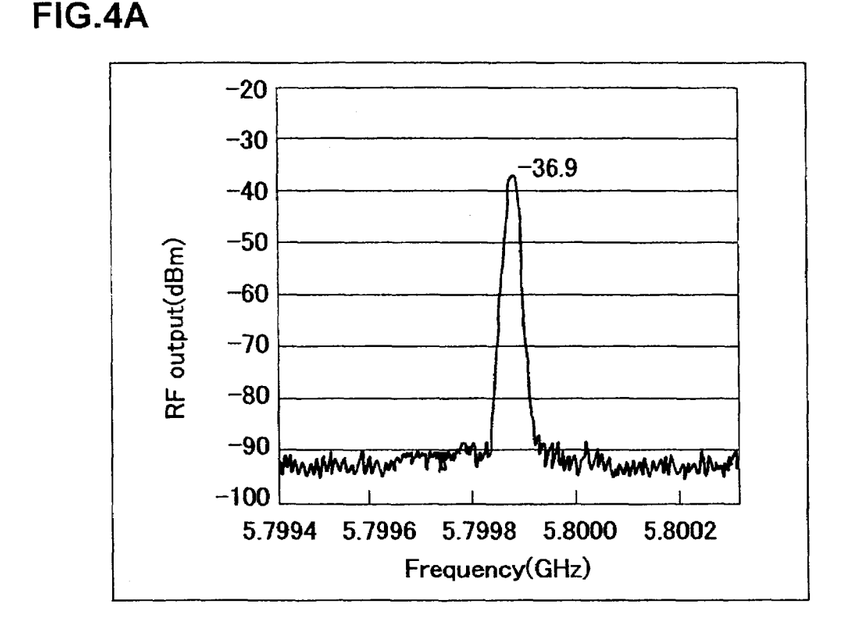
FIG. 4A is a radio signal output frequency characteristic view of the first radio base station for an SOA-EAM employed in the optical transmission system of radio signal over optical fiber link in the first embodiment.
Figure 4B:
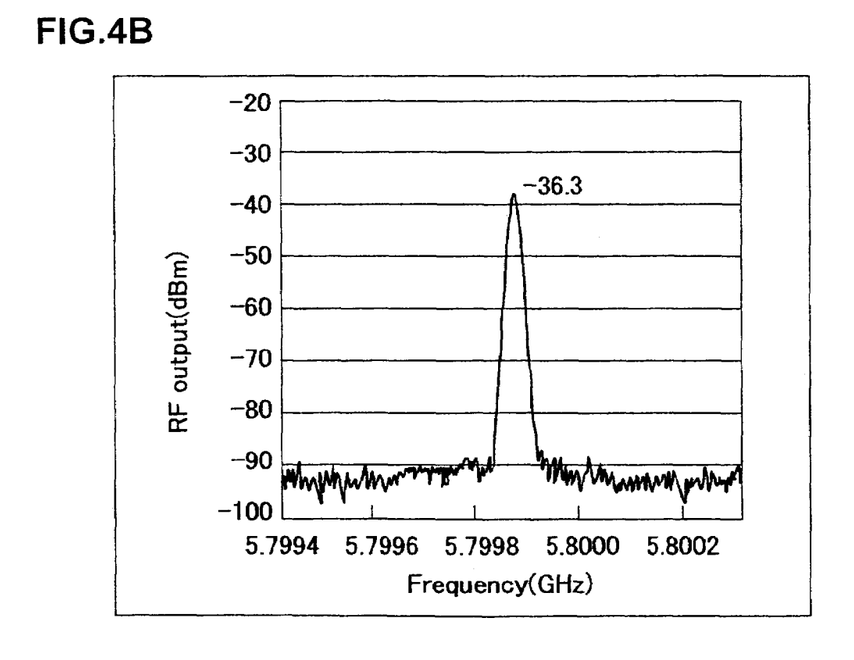
FIG. 4B is a radio signal output frequency characteristic view of the $n^{th}$ radio base station therefor.

FIGS. 4A and 4B show the radio signal output (a) of the SOA-EAM 18 of the first base station and the radio signal output (b) of the SOA-EAM 18 of the $n^{th}$ base station which are measured by a spectrum analyzer, respectively. As can be seen from FIGS. 4A and 4B, it is observed that both of the radio signal outputs (a) and (b) have the same level (about −36 dBm: $10 \log_{10} X(mW) = Y(dBm)$, e.g., 1 mW=0 dBm) of radio signal output power, thus demonstrating that the output power does not lower even if the terminal base station 12 is remote from the control station 11. The optical signal output power from each base station at this time is −3 dBm.

As can be understood from the above, by employing the down link optical transmission system with the base stations dependently connected in this embodiment, the optical power distributed to the respective base stations can be maintained even if the number of base stations increases and it is possible to easily dependently connect the base stations to the optical fiber. Further, the equal optical power is transmitted from the respective base stations. Due to this, even if a base station is added halfway along the optical fiber, it is possible to maintain the optical power from the added base station and this addition does not influence the other base stations.

Second Embodiment

Figure 2:
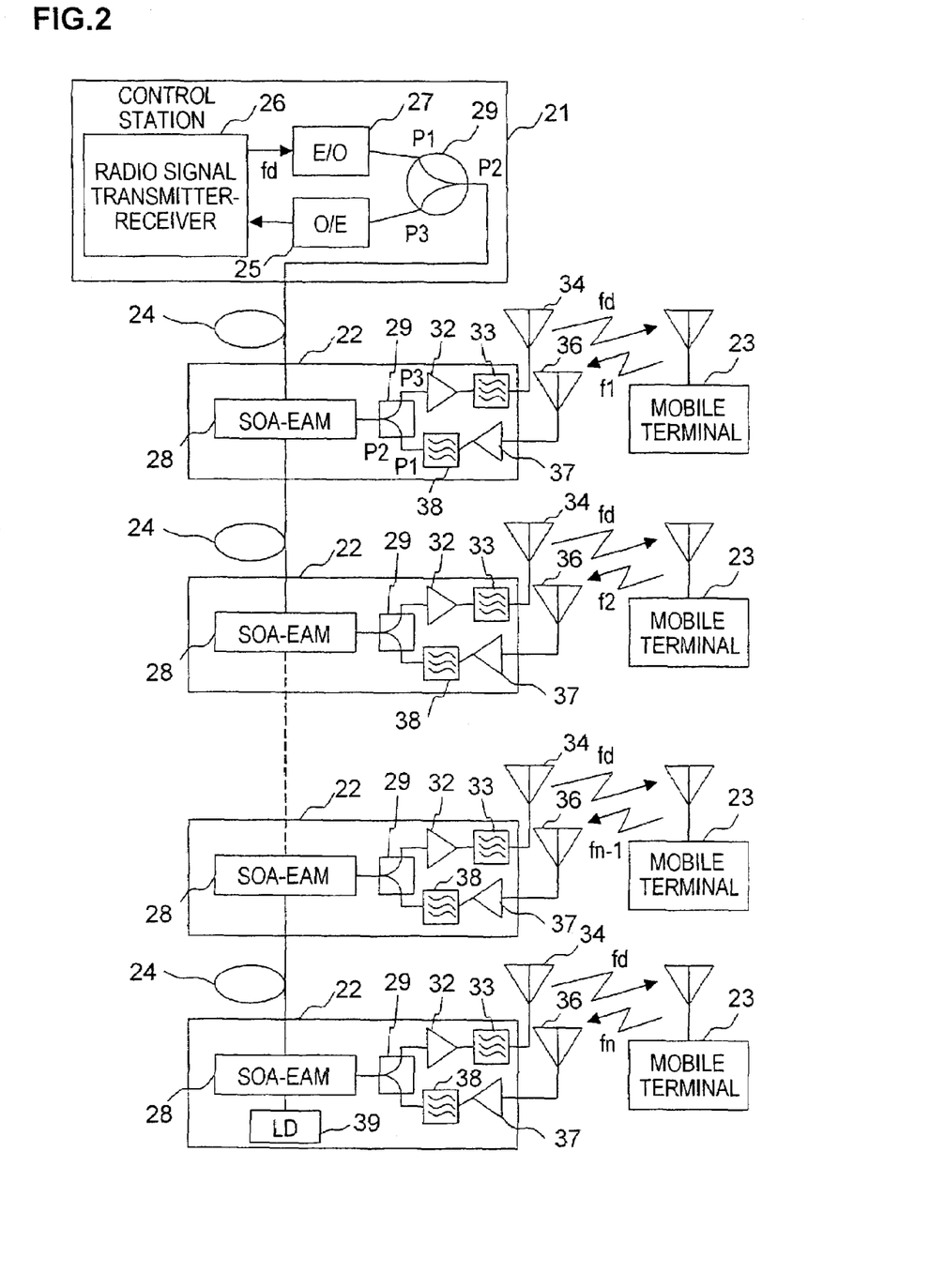
FIG. 2 is a schematic block diagram of an optical transmission system of radio signal over optical fiber link in the second embodiment according to the present invention.

FIG. 2 is a block diagram of an optical transmission system of a radio signal over an optical fiber link in the second embodiment according to the present invention. As shown in FIG. 2, in an optical transmission system for up and down links in this embodiment, means for dividing transmission time to up transmission time and down transmission time is used, whereby it is possible to transmit signals over up and down links using one optical fiber. Specifically, a control station 21 controls a radio signal transmitter-receiver 26 and an electrical-to-optical converter (E/O converter) 25 comprised therein, as well as an up link signal laser diode (LD) 39 which is provided at a terminal base station 22, and divides transmission time to up and down transmission time in a preset cycle. However, if it is necessary to transmit a transmission signal while adding the control signal of the LD 39 of the terminal base station 22 remote from the control station 21 and if a signal is transmitted to, for example, mobile stations 23, it is necessary to transmit control information to the respective mobile terminals 23.

The control station 21 comprises a radio signal transmitter-receiver 26, an electrical-to-optical converter (E/O converter) 27 for a down link, an optical-to-electrical converter (O/E converter) 25 for an up link, and an optical circulator 29 separating an up optical signal from a down optical signal. The optical circulator 29 functions to output an optical signal input from a port P1 to a port P2, and to output an optical signal input from the port P2 to a port P3.

At down transmission time, on the down link, a radio signal with a frequency $f_d$ is converted to an optical signal by the E/O converter 27, passed from the port 1 to the port 2 of the optical circulator 29, and transmitted to an optical fiber 24 as in the case of the first embodiment. A plurality of (n) radio base stations 22 are dependently connected to the optical fiber 24. Each radio base station 22 comprises an SOA-EAM 28, an electric circulator 29, a down radio signal amplifier (RF-AMP) 32, a filter 33, an antenna 34, an up radio signal amplifier (RF-AMP) 37, a filter 38, and an antenna 36.

The electric circulator 29 functions to output a radio signal input from a port P1 to a port P2, and to output a radio signal input from the port P2 to a port P3. The SOA-EAM 28 absorbs a part of the optical signal transmitted by the optical fiber 24, and converts the optical signal to a radio signal. The radio signal thus converted is passed from the port P2 to the port P3 of the electric circulator 29, and amplified to have desired power by the RF-AMP 32. Only the signal with the down radio frequency $f_d$ is fetched by the filter 33, output from the antenna 34 to the air, and received the radio signal by the mobile terminals 23.

The filter 33 is provided to remove radio signals with up link frequencies $f_1$ to $f_n$ if they enter the base station 22. The SOA-EAM 28 outputs the remainder of the optical signal transmitted by the optical fiber 24 to the next radio base station 22 through the optical fiber 24.

Thus, each radio base station 22 converts the optical signal to the radio signal and transmits the radio signal to the next radio base station 22. As already described in the first embodiment, since the SOA compensates for the optical power absorbed by the EAM and amplifies the signal at the corresponding base station 22, the respective base stations 22 are equal in the output power of the radio signal.

A laser diode (LD) 39 is added to the terminal ($n^{th}$) radio base station 22. At up transmission time, the E/O converter 27 of the control station 21 is turned off and the LD 39 is turned on at the $n^{th}$ radio base station 22.

On the up link, the antenna 36 of each radio base station 22 receives a radio signal with the frequency $f_n$ transmitted from the mobile terminal 23, the RF-AMP 37 amplifies the radio signal to have desired power, the filter 38 fetches only the signal with the frequency $f_n$ and the signal thus fetched is input into the SOA-EAM 28. The SOA-EAM 28 converts the radio signal to an optical signal, a light intensity modulation signal modulating the light of LD 39, and then is output to the optical fiber 24.

The optical signal, on which the radio signal frequency $f_n$ is carried, is input into the SOA-EAM 28 of the next $(n-1)^{th}$ base station 22 and a radio signal with a frequency $f_{n-1}$ is superposed on the signal with the frequency $f_n$ by the SOA-EAM 28. The optical signal, on which the radio signal frequencies $f_n$ and $f_{n-1}$ are carried, is transmitted from the SOA-EAM 28. Thus, at each radio base station 22, the radio signal is converted to the optical signal and the optical signal is transmitted to the next base radio station 22. The frequencies of the radio signals at this time differ among the mobile terminals 23, i.e., $f_d \neq f_1 \neq f_2 \neq \ldots \neq f_{n-1} \neq f_n$.

Figure 5A:
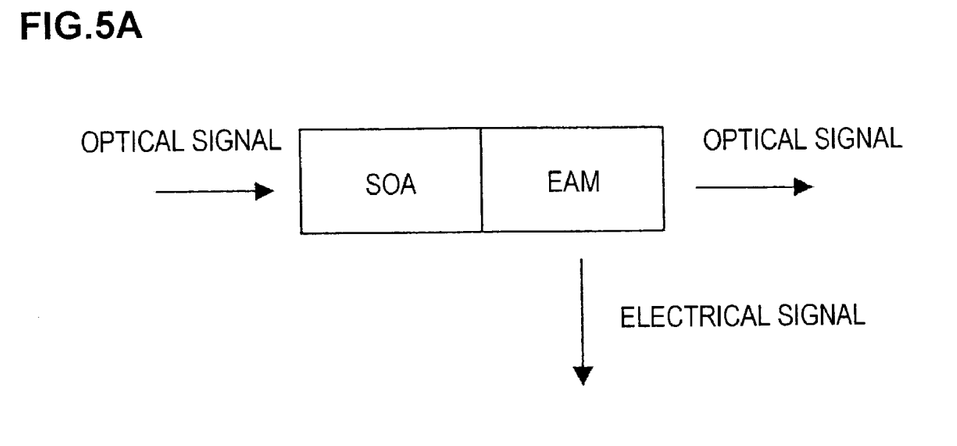
FIG. 5A is an explanatory view of an SOA-EAM employed in the optical transmission system of radio signal over optical fiber link in each of the first to third embodiments if the SOA-EAM is used in O/E conversion.
Figure 5B:
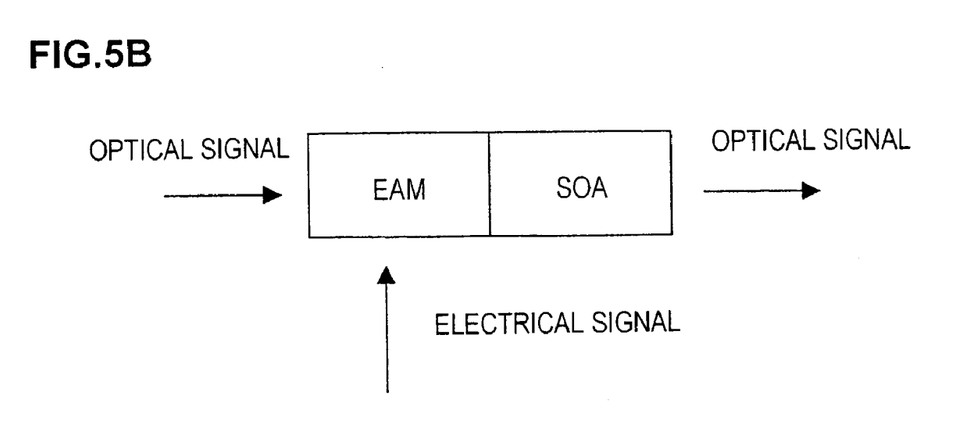
FIG. 5B is an explanatory view thereof if the SOA-EAM is used in E/O conversion.

In this embodiment, the semiconductor device of the SOA-EAM 28 is used as both an optical-to-electrical converter (O/E converter), as in the case of the first embodiment as shown in FIG. 5A and an electrical-to-optical converter (E/O converter) as shown in FIG. 5B. The EAM shown in FIG. 5B is used to serve the original function of the EAM, i.e., to input a radio signal and to modulate an optical signal. To compensate for optical loss at this radio base station 22 and optical loss generated between this radio base station 22 and the next radio base station 22, the SOA of the SOA-EAM 28 amplifies the signal to have desired power.

According to the optical transmission system in this embodiment, as in the case of the first embodiment, the use of the SOA-EAM 28 enables the optical signal power transmitted to the respective base stations 22 to be maintained even if the number of base stations increases. Further, on the up link, the SOA-EAM 28 is used as an electrical-to-optical converter. In each of the base stations 22 dependently connected to the control station 21, the SOA-EAM 28 can be used as both the O/E converter and the E/O converter, whereby the base stations can be made small in size. Besides, by dividing communication time to up communication time and down communication time, it is possible to transmit signals for both up and down links using one optical fiber link, and it is possible to make effective use of the optical fiber link.

Third Embodiment

Figure 3:
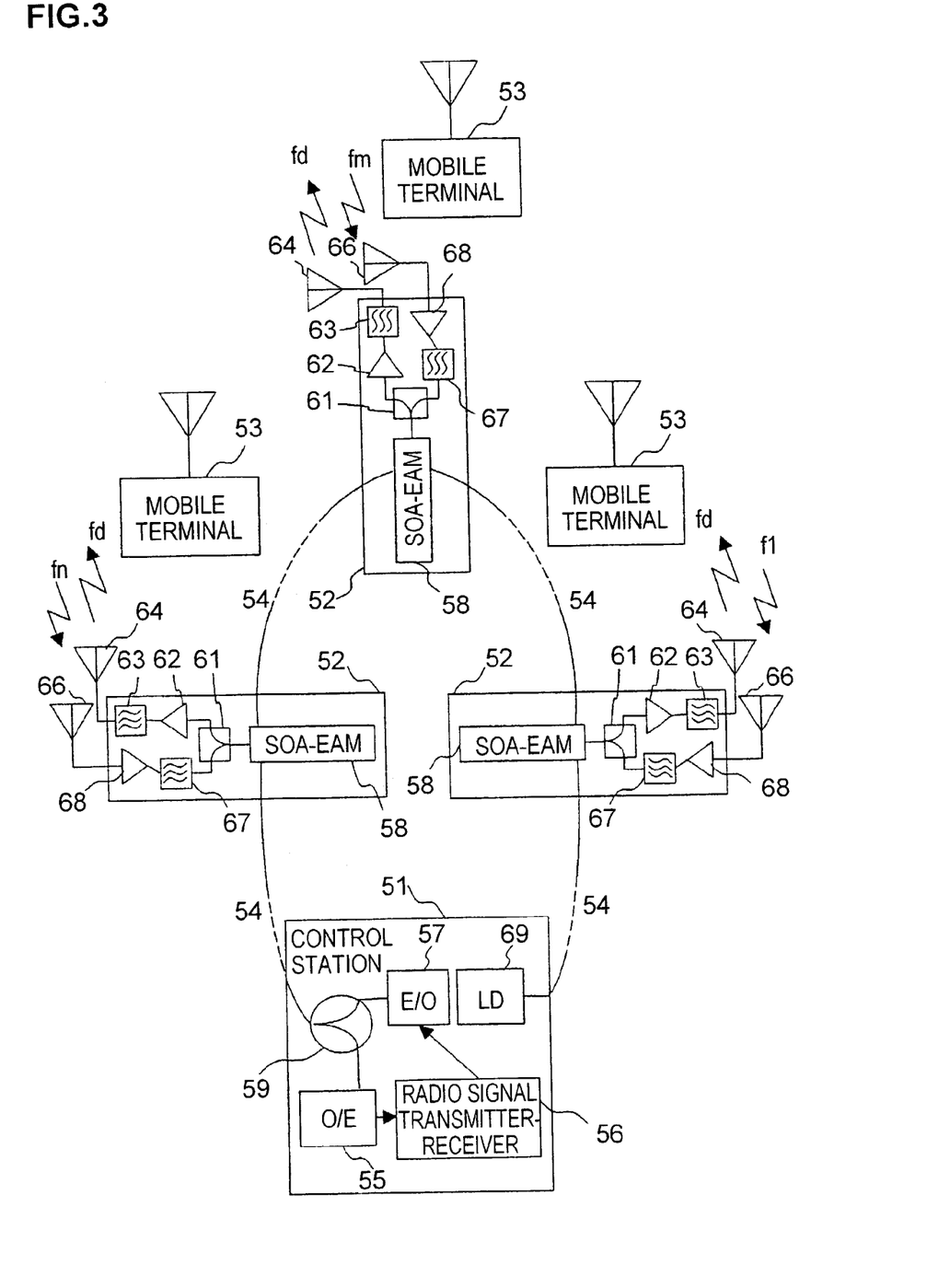
FIG. 3 is a schematic block diagram of an optical transmission system of radio signal over optical fiber link in the third embodiment according to the present invention.

FIG. 3 is a block diagram of an optical transmission system of a radio signal over an optical fiber link in the third embodiment according to the present invention. In this embodiment, a ring-like optical fiber link, as well as means for dividing transmission time to up transmission time and down transmission time as described above the second embodiment, are provided in the optical transmission system for up and down links. As shown in FIG. 3, a control station 51 comprises a radio signal transmitter-receiver 56, an electrical-to-optical converter (E/O converter) 57 for a down link, an optical-to-electrical converter (O/E converter) 55 for an up link, an optical circulator 59 separating an up optical signal from a down optical signal, and an LD 69 for the up link.

As in the case of the first embodiment, at down transmission time, on the down link, a radio signal with a frequency $f_d$ is converted to an optical signal by the E/O converter 57, passed from the port P1 to the port P2 of the optical circulator 59, and output to an optical fiber 54. A plurality of (n) radio base stations 52 are dependently connected to the control station 51 using the optical fiber 54 and laid in the form of a ring, and the terminal end of the ring returns to the control station 51 and connected to the LD 69.

Each radio base station 52 comprises an SOA-EAM 58, an electric circulator 61, a down radio signal amplifier (RF-AMP) 62, a filter 63, an antenna 64, an up radio signal amplifier (RF-AMP) 67, a filter 68, and an antenna 66.

In this embodiment, as in the case of the second embodiment, the SOA-EAM 58 absorbs a part of the optical signal transmitted by the optical fiber 54, and converts the optical signal to a radio signal. The radio signal thus converted is passed from the port P2 to the port P3 of the electric circulator 61. The RF-AMP 62 amplifies the radio signal to have desired power, the filter 63 fetches only the radio signal with a down radio frequency $f_d$, and the radio signal is output from the antenna 64 to the air. Each mobile terminal 23 receives the radio signal. The filter 63 is provided to remove radio signals with up link frequencies $f_1$ to $f_n$ if they enter the radio base station 52.

The SOA-EAM 58 outputs the remainder of the optical signal transmitted by the optical fiber 54 to the next radio base station 52 through the optical fiber 54. At each radio base station 52, the radio signal is converted to an optical signal and the optical signal is transmitted to the next radio base station 52. As already described in the first embodiment, the SOA of the SOA-EAM 58 of each radio base station 52 compensates for the optical power absorbed by the EAM and amplifies the signal. Due to this, the respective radio base stations 52 are equal in the output power of the radio signal.

At up transmission time, the E/O converter of the control station 51 is turned off and the LD 69 of the control station 51 is turned on. On the up link, the antenna 66 of each radio base station 52 receives a radio signal with the frequency $f_n$ transmitted from the mobile terminal 53, the RF-AMP 67 amplifies the radio signal to have desired power, the filter 68 fetches only the radio signal with the frequency $f_n$ and the signal thus fetched is input to the SOA-EAM 68. The SOA-EAM 68 converts radio signal to an optical signal, modulating the light of LD 69, which is output to the optical fiber 54.

The optical signal, on which the radio signal frequency $f_n$ is carried, is input into the SOA-EAM 58 of the next $(n-1)^{th}$ radio base station 52 and a radio signal with a frequency $f_{n-1}$ is superposed on the signal with the frequency $f_n$ by the SOA-EAM 58. The optical signal, on which radio signal frequencies $f_n$ and $f_{n-1}$ are carried, is transmitted from the SOA-EAM 58. Thus, at each radio base station 52, the radio signal is converted to the optical signal and the optical signal is transmitted to the next radio base station 52. The frequencies of the radio signals at this time differ among the mobile terminals 53, i.e., $f_d \neq f_1 \neq f_2 \neq \ldots \neq f_{n-1} \neq f_n$.

As described so far, as in the case of the second embodiment, the SOA-EAM is used as both an optical-to-electrical converter and an electrical-to-optical converter whereby the base stations can be made small in size. By dividing up communication time from down communication time on one optical fiber, it is possible to make effective use of the link. Besides, by providing the ring-like optical fiber, the LD necessary for the up link can be disposed at the control station, thereby facilitating control.

The preferred embodiments of the optical transmission system of radio signal over optical fiber link according to the present invention have been described with reference to the accompanying drawings. However, the present invention is not limited to the embodiments. It is obvious that those having ordinary skill in the art can easily attain various modifications and changes within the scope of the technical concept described in claims which follow. It is appreciated that such modifications and changes are within the technical scope of the present invention.

In the embodiments described above, the present invention is applied to mobile communication which utilizes radio signals. As long as the optical fiber link is used, the present invention is applicable not only to the mobile communication but also to Fiber to the Air (FTTA) communication for transmitting data to immobile terminals such as homes and offices over the radio and communication which employs televisions, personal computers, telephones and the like as terminals.

As described so far, according to the present invention, if a plurality of base stations are dependently connected to a control stations using one optical fiber, the SOA-EAM is used as the E/O converter of each base station, thereby making optical coupler unnecessary. An attenuated signal is amplified by the SOA and the amplified signal is transmitted to the next base station. Therefore, even if the number of base stations increases, optical power does not lower and the signal can be transmitted to all the base stations with equal power. In addition, it is possible to facilitate adding a base station.

What is claimed is:

1. An optical transmission system for transmitting a radio signal over an optical fiber link for a down link, the optical transmission system comprising:
   a control station; and
   a plurality of base stations connected to one another by an optical fiber,
   wherein said control station comprises:
   a radio signal transmitter for transmitting a down electric signal; and
   an electrical-to-optical converter for converting the down electric signal to a down optical signal, and outputting the down optical signal to the optical fiber,
   wherein at least one of said base stations comprises:
   an amplifier-converter for converting a part of the down optical signal to the down electric signal;
   a radio signal amplifier for amplifying the down electric signal; and
   a down link antenna for transmitting the amplified down electric signal, and
   wherein said amplifier-converter comprises:
   a semiconductor optical amplifier for amplifying the down optical signal; and
   an electro-absorption modulator for permeating a remainder of the amplified down optical signal to transmit the remainder of the down optical signal to another base station, and detecting the part of the down optical signal to convert the part of the down optical signal to the down electric signal.

2. The optical transmission system according to claim 1, wherein
   said semiconductor optical amplifier and said electro-absorption modulator of said amplifier-converter are formed integrally with each other on a semiconductor substrate.

3. The optical transmission system according to claim 1, wherein
   the down electric signal transmitted from said down link antenna is to be received by a mobile terminal.

4. The optical transmission system according to claim 1, wherein
   a terminal base station of said plurality of base, stations comprises a photodiode for converting the down optical signal to the down electric signal.

5. A optical transmission system for transmitting a radio signal over an optical fiber link for up and down links, the optical transmission system comprising:
   a control station; and
   a plurality of base stations connected to one another by an optical fiber,
   wherein said control station comprises:
   a radio signal transmitter-receiver for transmitting a down electric signal, and receiving an up electric signal;
   an electrical-to-optical converter for converting the down electric signal to a down optical signal;
   an optical-to-electrical converter for converting an up optical signal to the up electric signal; and
   an optical circulator for sending the down optical signal from said electrical-to-optical converter to the optical fiber and the up optical signal from the optical fiber to said optical-to-electrical converter,
   wherein at least one of said base stations comprises:
   an amplifier-converter for converting a part of the down optical signal input from the optical fiber to the down electric signal, and converting the up electric signal to the up optical signal to output the converted up optical signal to the optical fiber;
   an electric circulator for outputting the down electric signal output from said amplifier-converter and inputting the up electric signal to the amplifier-converter;
   a radio signal amplifier for amplifying the down electric signal;
   a down link filter for filtering the amplified down electric signal;
   a down link antenna for transmitting the filtered down electric signal;
   an up link antenna for receiving the up electric signal;
   an up link radio signal amplifier for amplifying the up electric signal; and
   an up link filter for filtering the amplified up electric signal,
   wherein a terminal base station of said plurality of base stations comprises, in the optical fiber, a laser diode for outputting light, and
   wherein said amplifier-converter comprises:
   a semiconductor amplifier for amplifying the down optical signal input from the optical fiber on the down link, and amplifying the up optical signal input from the optical fiber on the up link; and
   an electro-absorption modulator for permeating a remainder of the amplified down optical signal to transmit the remainder of the down optical signal to another base station, and detecting the part of the down optical signal to convert the part of the down optical signal to the down electric signal on the down link said electro-absorption modulator converting the up electric signal to the up optical signal using the light of said laser diode on the up link.

6. The optical transmission system according to claims 5, wherein
said semiconductor optical amplifier and said electro-absorption modulator of said amplifier-converter are formed integrally with each other on a semiconductor substrate.

7. The optical transmission system according to claim 5, wherein
said control station periodically controls said radio signal transmitter-receiver, said electrical-to-optical converter, and said laser diode at up time and down time.

8. The optical transmission system according to claim 5, wherein
the up radio signal differs in frequency among said plurality of base stations.

9. The optical transmission system according to claim 5, wherein
the down electrical signal transmitted from said down link antenna is to be received by a mobile terminal.

10. An optical transmission systems for transmitting a radio signal over an optical fiber link for up and down links, the optical transmission system comprising:
a control station; and
a plurality of base stations connected to one another by an optical fiber in a ring form relative to said control station,
wherein said control station comprises:
a radio signal transmitter-receiver for transmitting a down electric signal, and receiving an up electric signal;
an electrical-to-optical converter for converting the down electric signal to a down optical signal;
an optical-to-electrical converter for converting an up optical signal to the up electric signal;
an optical circulator for sending the down optical signal from said electrical-to-optical converter to the optical fiber and the up optical signal from the optical fiber to said optical-to-electrical converter; and
a laser diode for outputting light for modulating the up optical signal to the optical fiber,
wherein each of said base stations comprises:
an amplifier-converter for converting a part of the down optical signal input from the optical fiber to the down electric signal, converting the up electric signal to the up optical signal to output the converted up optical signal to the optical fiber;
an electric circulator for outputting the down electric signal output from said amplifier-converter and inputting the up electric signal to the amplifier-converter;
a radio signal amplifier for amplifying the down electric signal;
a down link filter for filtering the amplified down electric signal;
a down link antenna for transmitting the filtered down electric signal;
an up link antenna for receiving the up electric signal;
an up link radio signal amplifier for amplifying the up electric signal; and
an up link filter for filtering the amplified up electric signal, and
wherein said amplifier-converter comprises:
a semiconductor amplifier for amplifying the down optical signal input from the optical fiber on the down link, and amplifying the up optical signal input from the optical fiber on the up link; and
an electro-absorption modulator for permeating a remainder of the amplified down optical signal to transmit the remainder of the down optical signal to another base station, and detecting the part of the down optical signal to convert the part of the down optical signal to the down electric signal on the down link, said electro-absorption modulator converting the up electric signal to the up optical signal using the light of said laser diode on the up link.

11. The optical transmission system according to claim 10, wherein
said semiconductor optical amplifier and said electro-absorption modulator of said amplifier-converter are formed integrally with each other on a semiconductor substrate.

12. The optical transmission system according to claim 10, wherein
said control station periodically controls said radio signal transmitter-receiver, said electrical-to-optical converter, and said laser diode at up time and down time.

13. The optical transmission system according to claim 10, wherein
the up radio signal differs in frequency among said plurality of base stations.

14. The optical transmission system according to claim 10, wherein
the down electrical signal transmitted from said down link antenna is to be received by a mobile terminal.

* * * * *